United States Patent
Zhodzishsky et al.

(10) Patent No.: US 8,213,864 B1
(45) Date of Patent: Jul. 3, 2012

(54) METHOD AND SYSTEM FOR A REDUCED USB POLLING RATE TO SAVE POWER ON A BLUETOOTH HOST

(75) Inventors: Victor Zhodzishsky, Potomac, MD (US); Shawn Shiliang Ding, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/399,086

(22) Filed: Feb. 17, 2012

Related U.S. Application Data

(63) Continuation of application No. 12/423,419, filed on Apr. 14, 2009, now Pat. No. 8,135,346.

(60) Provisional application No. 61/119,792, filed on Dec. 4, 2008.

(51) Int. Cl.
*H04B 7/00* (2006.01)

(52) U.S. Cl. .................................. 455/41.2; 455/127.5

(58) Field of Classification Search .................. 370/346; 455/41.2, 41.3, 127.5, 343.2, 343.3, 574
See application file for complete search history.

(56) References Cited

U.S. PATENT DOCUMENTS

| | | | |
|---|---|---|---|
| 6,842,611 B2 | 1/2005 | Beck et al. |
| 7,564,832 B2 | 7/2009 | Van Parys |
| 7,656,853 B2 | 2/2010 | Albulet |
| 7,693,485 B2 | 4/2010 | Parys |
| 7,835,767 B2 | 11/2010 | Satoh et al. |
| 2002/0028657 A1 | 3/2002 | Davies |
| 2003/0013411 A1 | 1/2003 | Uchiyama |
| 2005/0070227 A1 | 3/2005 | Shen et al. |
| 2005/0122990 A1 | 6/2005 | Parys |
| 2006/0140166 A1 | 6/2006 | Albulet |
| 2008/0207126 A1 | 8/2008 | Grushkevich et al. |
| 2010/0144271 A1 | 6/2010 | Zhodzishsky et al. |

*Primary Examiner* — Lincoln Donovan
*Assistant Examiner* — William Hernandez
(74) *Attorney, Agent, or Firm* — Thomas, Kayden, Horstemeyer & Risley, LLP

(57) ABSTRACT

A Bluetooth host in a normal mode is enabled to monitor activities at USB endpoints. A Bluetooth USB radio has one or more active Bluetooth connections with peer Bluetooth radios. When each of the Bluetooth connections is in sniff mode, the Bluetooth host enables cancellation of normal USB activities at USB endpoints to enter a low power mode. The Bluetooth connections are still alive while the Bluetooth host is in the low power mode. In the low power mode, the Bluetooth host is enabled not to poll the bulk endpoint and to poll a USB interrupt endpoint in extended intervals for Bluetooth data received from the Bluetooth USB radio. The Bluetooth host is enabled to switch from the low power mode to the normal mode to process the received Bluetooth data over the bulk endpoint when a specific HCI event is received over the interrupt endpoint.

20 Claims, 6 Drawing Sheets

METHOD AND SYSTEM FOR A REDUCED USB POLLING RATE TO SAVE POWER ON A BLUETOOTH HOST

CROSS-REFERENCE TO RELATED APPLICATIONS/INCORPORATION BY REFERENCE

This patent application is a continuation of U.S. patent application Ser. No. 12/423,419 entitled "METHOD AND SYSTEM FOR A REDUCED USB POLLING RATE TO SAVE POWER ON A BLUETOOTH HOST" and filed on Apr. 14, 2009, which makes reference to, claims priority to and claims benefit from U.S. Provisional Patent Application Ser. No. 61/119,792 filed on Dec. 4, 2008.

The above stated applications are hereby incorporated herein by reference in their entirety.

FIELD OF THE INVENTION

Certain embodiments of the invention relate to wireless communication. More specifically, certain embodiments of the invention relate to a method and system for a reduced USB polling rate to save power on a Bluetooth host.

BACKGROUND OF THE INVENTION

Mobile platforms are designed to service traffic from various bus mastering devices such as, for example, an USB-connected Bluetooth radio, with low response time, typically less than a few microseconds. As a result, most components of mobile platforms remain in a high state of readiness even when devices are idle or otherwise underutilized.

Energy efficiency is a key consideration to improve battery life for mobile platforms. Devices play a key role in energy efficiency for mobile platforms. The device performance depends on a central processor unit (CPU) as well as hardware and software system components such as, for example, the operating system, the graphics and I/O subsystems, application software, and/or host memory.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method is provided for a reduced USB polling rate to save power on a Bluetooth host, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a reduced USB polling rate to save power on a Bluetooth host. In accordance with various embodiments of the invention, a Bluetooth enabled device may comprise a Bluetooth host and a Bluetooth USB radio. One or more Bluetooth connections may be active between the Bluetooth USB radio and peer Bluetooth radios. The Bluetooth host in a normal mode is operable to monitor activities at corresponding USB endpoints. The Bluetooth host may be enabled to cancel normal USB activities at the USB endpoints when, for example, each of the associated one or more active Bluetooth connections is in a Bluetooth sniff mode. The Bluetooth host may enter a low power mode when it is idle or under light load. The associated Bluetooth connections are alive (connected) while the Bluetooth host is in the low power mode. The USB endpoints may comprise a control endpoint, an interrupt endpoint, a bulk endpoint and one or more isochronous endpoints. In the normal mode, the Bluetooth host may be enabled to receive and process Bluetooth data such as ACL data and SCO data over the bulk endpoint and the one or more isochronous endpoints, respectively. The Bluetooth host may be enabled to determine whether the associated Bluetooth data connections operate in a particular Bluetooth mode of operation such as Bluetooth sniff mode before cancelling normal USB activities at the USB endpoints. In the low power mode, the Bluetooth host may be enabled not to poll the bulk endpoint and to poll the interrupt endpoint at various extended interrupt intervals in order to receive Bluetooth data from the Bluetooth USB radio. The Bluetooth host may be enabled to switch from the low power mode to the normal mode when a specific HCI event is received over the interrupt endpoint. Subsequently, the Bluetooth host may be enabled to poll the bulk endpoint for Bluetooth data and process the Bluetooth data received over the bulk endpoint.

Figure 1:
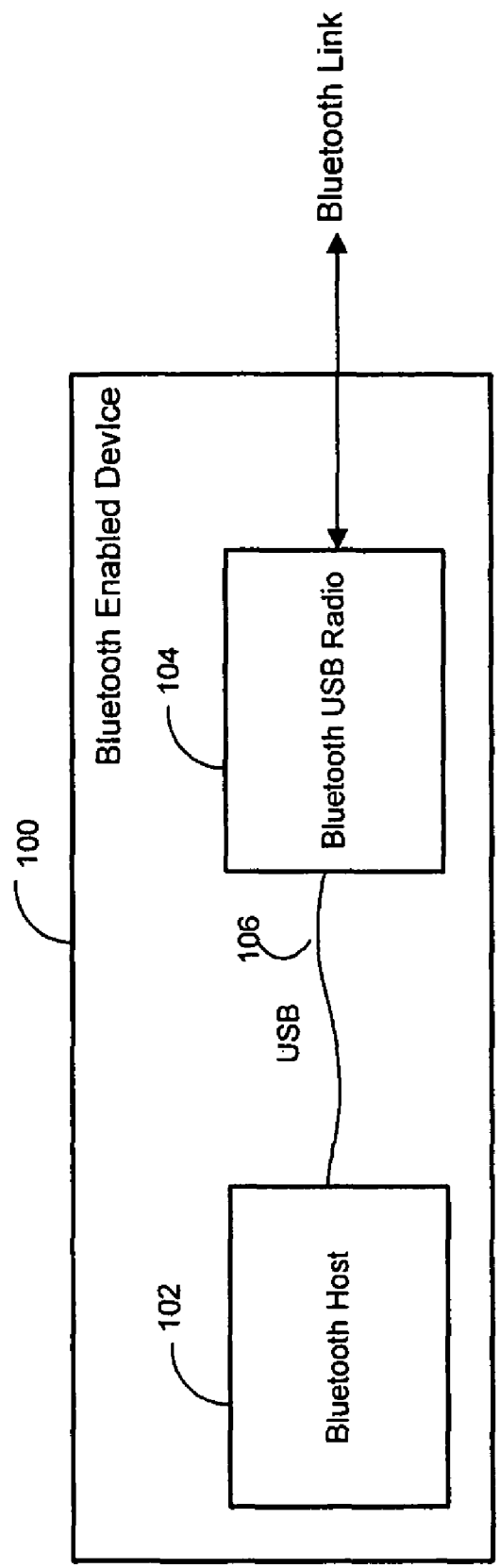
FIG. 1 is an exemplary Bluetooth enabled device that is operable to utilize a reduced USB polling rate to save Bluetooth host power, in accordance with an embodiment of the invention.

FIG. 1 is an exemplary Bluetooth enabled device that is operable to utilize a reduced USB polling rate to save Bluetooth host power, in accordance with an embodiment of the invention. Referring to FIG. 1, there is shown a Bluetooth enabled device 100 comprising a Bluetooth host 102 and a Bluetooth USB radio 104. The Bluetooth host 102 is communicatively coupled to the Bluetooth device 104 via a Universal Serial Bus (USB) connection.

The Bluetooth host 102 may comprise suitable logic circuitry, interfaces and/or code that may be enabled to manipulate and control the Bluetooth USB radio 104 via a set of Bluetooth protocols to support various Bluetooth applications such as, for example, Bluetooth hands-free and Bluetooth audio streaming. The Bluetooth host 102 may be enabled to communicate data between a Bluetooth application and the Bluetooth USB radio 104 via the USB connection. The USB connection is an industry standard communication connection interface on host devices such as personal computers and consumer electronics. USB connections allow stand-alone electronic devices such as a Bluetooth USB radio to be connected to a host device such as, for example, a computer, or to each other. USB connections may be wired and/or wireless.

The Bluetooth host 102 may be enabled to transfer data received from Bluetooth applications on the Bluetooth host 102 to the Bluetooth USB radio 104 over the USB connection 106. The Bluetooth host 102 may be enabled to read data received from the Bluetooth USB radio 104, and transfer the received data to corresponding Bluetooth applications on the Bluetooth host 102. Since the Bluetooth host 102 may not know whether data is received via one or more associated Bluetooth connections, the Bluetooth host 102 is configured to repeatedly check for data from the Bluetooth USB radio 104 by a polling mechanism. The Bluetooth host 102 may be enabled to read data received from the Bluetooth USB radio 104 only when the Bluetooth USB radio 104 is polled.

The Bluetooth host 102 may run on various hardware platforms comprising Intel, or by AMD, for example. The Bluetooth host 102 may also utilize various Operating Systems comprising for example, Microsoft Windows Vista, Microsoft's Windows CE, Linux, and/or PalmOS. Energy efficiency, which is important for various platforms such as a mobile platform, translates to longer battery life for the mobile platform. Mobile platform power consumption may be modeled simply as active power consumed during a relatively short period (~5%) combined with idle power consumed during the remainder (~95%), for example. The idle power consumption is the predominant operational state under normal usage for mobile platforms. Much longer battery life may be achieved by lowering the idle power consumption of mobile platforms.

The Bluetooth host 102 may be operated either in a normal mode or in a low power mode. In the normal mode, circuits and signals on the Bluetooth host 102 may be fully turned on to process traffic to and/or from the Bluetooth USB radio 104, and/or handle various operations. The traffic may comprise various Bluetooth packets such as, for example, HCI command packets, HCI event packets, Bluetooth data packets. The Bluetooth data packets may comprise ACL packets and/or SCO packets. In a low power mode, at least a portion of the circuits and signals on the Bluetooth host 102 may be turned off. An associated processor on the Bluetooth host 102 may also be aperiodically or periodically turned off. In this regard, the Bluetooth host 102 may be configured to transition between a normal mode and a low power mode depending on traffic to and/or from the Bluetooth host 102.

Traffic between the Bluetooth host 102 and the Bluetooth USB radio 104 may be driven by USB bus-mastering. USB bus-mastering traffic may be communicate via the USB connection 106. The USB bus-mastering traffic may be generated from the Bluetooth host 102 as well as the Bluetooth USB radio 104. In instances where the USB bus-mastering traffic may be generated from the one or more associated Bluetooth connections of the Bluetooth USB radio 104, the Bluetooth host 102 may be enabled to stay in a normal mode or begin transitioning out of a low power mode to a normal mode to process the generated USB bus-mastering traffic. When mode transitions from the low power mode to the normal mode occur in the presence of the bus-mastering traffic, the power of the Bluetooth host 102 may be scaled up appreciably. In this regard, in order to save energy when the Bluetooth host 102 is idle, the Bluetooth host 102 may be commanded to enter the low power mode. During the low power mode, the Bluetooth host 102 may be configured to poll the Bluetooth USB radio 104 in extended intervals (low polling rate). In instances where Bluetooth data such as ACL data may be received from the Bluetooth USB radio 104, the Bluetooth host 102 may be enabled to return to the normal mode from the low power mode to process the received Bluetooth data.

The Bluetooth USB radio 104 may comprise suitable logic circuitry, interfaces and/or code that may be enabled to couple a Bluetooth module to the Bluetooth host 102. The Bluetooth USB radio 104 may be communicatively coupled to the Bluetooth host 102 via a USB connection. The Bluetooth USB radio 104 may operable to access to the Bluetooth module from the Bluetooth host 102. The Bluetooth USB radio 104 may be embodied, for example, as a USB dongle or an integrated component of the Bluetooth host 102. The Bluetooth USB radio 104 may be enabled to transfer data to the Bluetooth host 102 as a response to a request for data from the Bluetooth host 102. In instances where the Bluetooth data received through one or more Bluetooth connections (ACL and SCO) associated with the Bluetooth module may exist in the Bluetooth USB radio 104, the Bluetooth USB radio 104 may be enabled to transfer the received Bluetooth data to the Bluetooth host 102 via the USB connection. The Bluetooth USB radio 104 may be enabled to send a message such as NAK (negative acknowledge) to the Bluetooth host 102 when no received data from the one or more Bluetooth connections exists in the Bluetooth USB radio 104. The Bluetooth USB radio 104 may be polled aperiodically or periodically by the Bluetooth host 102. The Bluetooth USB radio 104 may be enabled to transfer Bluetooth data to the Bluetooth host 102 in response to a request for data from the Bluetooth host 102. Alternatively, the Bluetooth USB radio 104 may be enabled to transfer received Bluetooth data to the Bluetooth host 102 when polled.

The Bluetooth USB radio 104 may be enabled to establish one or more Bluetooth connections with peer Bluetooth devices. Each of the established one or more Bluetooth connections may be in an active mode or a power-saving mode. In instances where the established one or more Bluetooth connections are in the active mode, the Bluetooth USB radio 104 may be operable to actively participate in communication via the established one or more Bluetooth connections. The power-saving mode comprises, for example, a sniff mode. In instances where the established one or more Bluetooth connections are in the sniff mode, device activity may be lowered. For example, the Bluetooth USB radio 104 is still synchronized to associated Bluetooth network (piconet), but wakes up periodically to participate in data transmission in prearranged sniff slots. In this regard, the Bluetooth USB radio 104 may be polled by the Bluetooth host 102 in extended intervals when each of the associated one or more Bluetooth connections in sniff mode. In instances when the Bluetooth USB radio 104 receives, for example, an ACL data packet over one of the associated one or more Bluetooth connections in sniff mode, the Bluetooth USB radio 104 may be configured to send a special HCI event over a USB interrupt endpoint to the Bluetooth host 102 before sending the received ACL data packet to the Bluetooth host 102 over a USB bulk endpoint.

In operation, the Bluetooth host 102 may be enabled to monitor activities from the Bluetooth USB radio 104 to obtain data received through associated one or more Bluetooth connections such as ACL connections. In instances where each of the associated one or more Bluetooth connections may be in a sniff mode, the Bluetooth host 102 may be idle. The Bluetooth host 102 may then be enabled to enter a low power mode to save power while the Bluetooth host is idle. During the low power mode, the Bluetooth host 102 may be enabled to poll the Bluetooth USB radio 104 in extended intervals. The Bluetooth host 102 may be configured to return to the normal mode from the low power mode when data is received from the Bluetooth USB radio 104.

Figure 2:
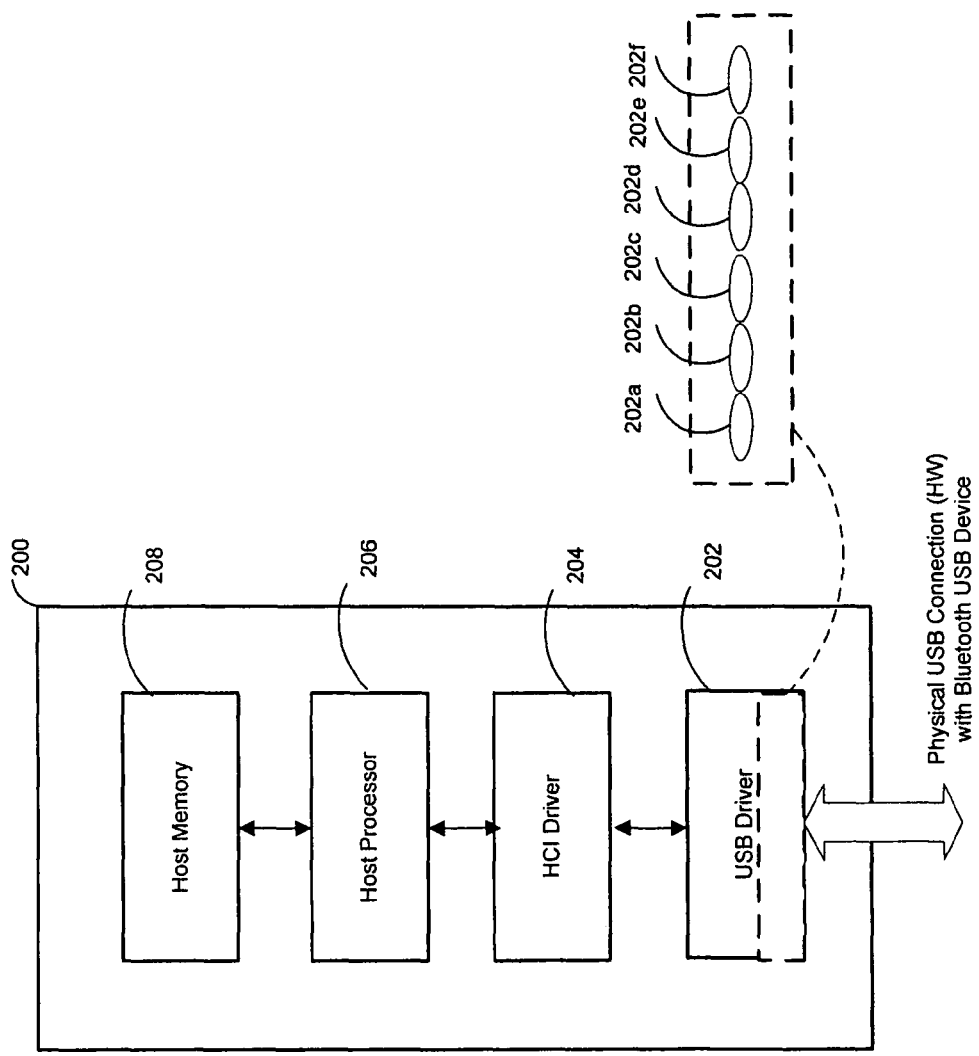
FIG. 2 is a block diagram that illustrates an exemplary Bluetooth host that is enabled to save Bluetooth host power via a reduced USB polling rate, in accordance with an embodiment of the invention.

FIG. 2 is a block diagram that illustrates an exemplary Bluetooth host that is enabled to save Bluetooth host power via a reduced USB polling rate, in accordance with an embodiment of the invention. Referring to FIG. 2, there is shown a Bluetooth host 200. The Bluetooth host 200 comprises a USB driver 202, a HCI driver 204, a host processor 206, and a host memory 208. The USB driver 202 comprises USB endpoints 202a-202f.

The USB driver 202 may comprise suitable logic circuitry, interfaces and/or code that may be enabled to request a data transfer by submitting an I/O request packet (IRP) to a lower-level driver on the Bluetooth USB radio 104. The USB driver 202 is a software entity on the Bluetooth host 102 to communicate with the Bluetooth USB radio 104 for a desired device configuration. The USB driver 202 may comprise a plurality of USB endpoints 202a-202f that may be required in order to function properly with the Bluetooth host 200. The plurality of USB endpoints 202a-202f may comprise, for example, a control endpoint 202a, an interrupt endpoint 202b, a bulk end point 202c, and one or more isochronous endpoints such as 202d-202f. The plurality of USB endpoints 202a-202f may be dynamically recognized via corresponding endpoint address upon, for example, driver initialization.

The control endpoint 202a is utilized to configure and control the Bluetooth USB radio 104. The control endpoint 201a may be also be operable to allow the Bluetooth host 200 to send, for example, HCI-specific commands to the Bluetooth USB radio 104.

The interrupt endpoint 202b may be utilized to ensure that HCI events may be delivered in a predictable and timely manner. An interrupt to the Bluetooth host 200 may bring the host processor 204 out of a low power mode such as the C3 state to a normal mode. The Bluetooth USB radio 104 may be enabled to interrupt the Bluetooth host 200 for critical events. However, the generation of frequent and/or random interrupts may also have a big impact on platform power. In this regard, to minimize power consumption on the Bluetooth host 200, the Bluetooth USB radio 104 may be operated in extend interrupt intervals, especially when the Bluetooth host 200 is idle or under light load.

The bulk endpoint 202c may be utilized to transfer ACL data to and from the Bluetooth device 200. The bulk endpoint 202c may enable transfer of, for example, multiple 64-byte buffers per one millisecond frame, depending on available bus bandwidth. The bulk endpoint 202c may enable error detection and correction to ensure data integrity for ACL data. The polling of the interrupt endpoint 202c may be required to receive ACL data from the Bluetooth USB radio 104. The polling of the interrupt endpoint 202c may be cancelled when no data is expected from the Bluetooth USB radio 104. The isochronous endpoints 202d-202f may be utilized to transfer, for example, SCO data to and from the Bluetooth host 200. The USB driver 202 may be configured to transfer the contents of the SCO data to the Bluetooth host 200 by, for example, first-in-first-out (FIFO).

The HCI driver 204 may comprise suitable logic circuitry, interfaces and/or code that may be enabled to provide a uniform interface between a Bluetooth host and a Bluetooth module. The HCI driver 204 is a software entity on the Bluetooth host 102 for accessing Bluetooth hardware capabilities from the Bluetooth host 200. The HCI driver 204 may be enabled to respond to interrupts issued by, for example, the Bluetooth USB radio 104.

The host processor 206 may comprise suitable logic circuitry, interfaces and/or code that may be enabled to manage Bluetooth host stacks and various applications. The host processor 206 may be enabled to run the Bluetooth protocol and various applications on a selected platform such as Microsoft Bluetooth Vista or an open source platform.

The host processor 206 may operate in either a normal power mode (a normal mode) or a low power mode. In the normal mode, circuits and signals in the host processor 206 may be fully turned on to process the traffic such as Bluetooth data from the Bluetooth USB radio 104. The low power mode is also called a C-state. The basic idea of the C-state is to stop idle components of the host processor 206 by, for example, cutting associated clock signals and/or power. The more idle components are stopped, the more energy may be saved, but more time is required for the host processor 206 to "wake up" to be again 100% operational. The C-state comprises various power management states such as, for example, a Stop Grant (C2) state, a Sleep (C3) state, a Deep Sleep (C3) state, and/or a Deeper Sleep (C4) state.

The power management states may be determined depending on a level of idle components stopped. For example, in the C2 state, main internal clocks such as core and system clocks and/or external clocks such as real-time clock (RTC) of the host processor 206 are stopped, while in the C3 state, all internal clocks and/or external clocks of the host processor 206 are stopped. The ability of the host processor 206 to enter and exit from the power management states allows power savings to an associated device such as the Bluetooth enabled device 100. In instances when each of associated connections of the Bluetooth USB radio 102 may be in a sniff mode, the host processor 206 in the normal mode may be idle. The host processor 206 may be operable to cancel USB activities on the USB connection and enter the C3 state, for example, in order to save host power. In the C3 state, the host processor 206 may be operable not to poll the bulk endpoint 202c and to poll the interrupt endpoint 202b in extended intervals. The host processor 206 may be enabled to return to the normal mode from the C3 state when Bluetooth data is received through the associated Bluetooth connections of the Bluetooth USB radio 102.

The host memory 208 may comprise suitable logic, circuitry and/or code that may enable storage of data and/or other information utilized by the host processor 206. For example, the host memory 208 may be utilized to store device configuration information for the Bluetooth USB radio 104. The host memory 208 may be enabled to store USB activity information over the USB connection between the Bluetooth host 102 and the Bluetooth USB radio 104. The host memory 208 may be enabled to store executable instructions to wake up or turn off, for example, main internal clocks and/or external clocks of the host processor. The host memory 208 may comprise RAM, ROM, low latency nonvolatile memory such as flash memory and/or other suitable electronic data storage capable of storing data and instructions.

In an exemplary operation, the USB driver 202 may be operable to communicate with, for example, the Bluetooth USB radio 104 for accessing data received through associated Bluetooth connections of the Bluetooth USB radio 104. The USB driver 202 may be enabled to communicate data received from the Bluetooth USB radio 104 with the HCI driver 204 for further processing by the host processor 206. The host processor 206 may be enabled to process the received data by running various Bluetooth protocol and/or applications stored in the host memory 208. In instances where the host processor 206 may be idle, the host processor 206 may be enabled to cancel USB activities over the USB connection and enter a low power mode such as the C3 state to save host power. In the C3 state, the host processor 206 may be enabled to poll the Bluetooth USB radio 104 in various extended intervals to read data received through the associated Bluetooth connections of the Bluetooth USB radio 104. The host processor 206 may be enabled to return to the normal mode when data received over the USB connection.

Figure 3:
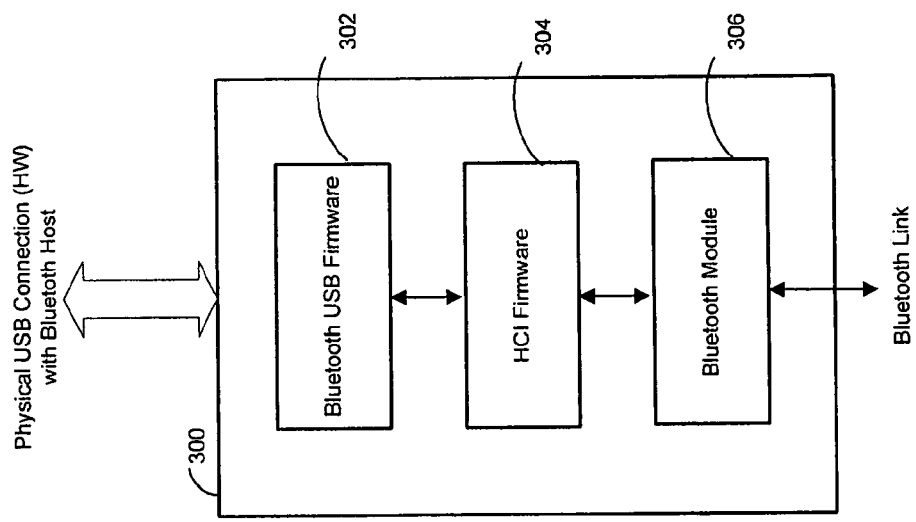
FIG. 3 is a block diagram that illustrates an exemplary Bluetooth USB radio that is polled with a reduced polling rate, in accordance with an embodiment of the invention.

FIG. 3 is a block diagram that illustrates an exemplary Bluetooth USB radio that is polled with a reduced polling rate, in accordance with an embodiment of the invention. Referring to FIG. 3, there is shown a Bluetooth USB radio 300. The Bluetooth USB radio 300 comprises a Bluetooth USB firmware 302, a HCI firmware 304, and a Bluetooth module 306.

The Bluetooth USB firmware 302 may comprise suitable logic circuitry, interfaces and/or code that may enable a Bluetooth host such as the Bluetooth host 200 to access the Bluetooth module 306 via the HCI firmware 304.

The HCI firmware 304 may comprise suitable logic, circuitry and/or code that may be operable to exchange information between the Bluetooth host 200 via the Bluetooth USB firmware and the Bluetooth module 306. The HCI firmware 304 may be utilized to form a bridge to the Bluetooth host 200 from the Bluetooth module 306. The HCI firmware 304 may be enabled to implement the HCI commands for the Bluetooth hardware. The HCI firmware 304 may be enabled to transfer HCI events to the Bluetooth host 200. In instances when each of associated Bluetooth connections of the Bluetooth USB radio 300 is in a sniff mode and when an ACL data packet is received over one of the associated Bluetooth connection, the HCI firmware 304 may be operable to transfer a special HCI event to a corresponding Bluetooth host such as the Bluetooth host 200. The special HCI event may indicate the reception of the ACL data packet to the Bluetooth host 200. The HCI firmware 304 may be configured to send the special HCI event to the Bluetooth host 200 before sending the received ACL data packet over the bulk endpoint 202b. The HCI firmware 304 may be operable to handle exchange Bluetooth data packets such as ACL data packets between the Bluetooth host 200 and Bluetooth USB radio 300. The HCI firmware 304 provides a generic interface to the Bluetooth module 306.

The Bluetooth module 306 may comprise suitable logic, circuitry, interfaces and/or code that may be enabled to transmit and/or receive signals over the Bluetooth air-interface. The Bluetooth host 102 may be enabled to transfer data received from applications on the Bluetooth host 200 to the Bluetooth module 306. The Bluetooth module 306 may be enabled to transmit the received data from the Bluetooth host over the associated Bluetooth connections to, for example, a peer Bluetooth device. The Bluetooth module 306 may be enabled to receive data over the associated Bluetooth connections to transmit to applications on the Bluetooth host 200.

In operation, The Bluetooth USB radio 300 may be enabled to communicate with the Bluetooth host 200. The Bluetooth host 200 may be configured to access the Bluetooth USB radio 300 via the Bluetooth USB firmware 302. The Bluetooth USB firmware 302 may be enabled to utilize various USB endpoints such as the control endpoint 202a, the interrupt endpoint 202b, the bulk endpoint 202c, and one or more isochronous endpoints 202d-202f to communicate with the Bluetooth host 200. For example, the Bluetooth USB firmware 302 may be enabled to utilize the control endpoint 202a for configuring and/or controlling the Bluetooth USB radio 200. The control endpoint 202a may also be utilized by the Bluetooth USB firmware 302 for communicating HCI-specific commands to the Bluetooth USB radio 300. The Bluetooth USB firmware 302 may be enabled to utilize the interrupt endpoint 202b to interrupt the Bluetooth host 200 to ensure that HCI events from the HCI firmware 304 may be delivered to the Bluetooth host 200 in a timely manner. In the event that each of the associated Bluetooth connections of the Bluetooth USB radio 300 is in a sniff mode and ACL data packets are received over one or more of the associated Bluetooth connection, the HCI firmware 304 may be operable to transfer a special HCI event to the Bluetooth host 200 for the reception of the ACL data packets. The HCI firmware 304 may be configured to send the special HCI event to the Bluetooth host 200 before sending the received ACL data packets over the bulk endpoint 202c.

Figure 4:
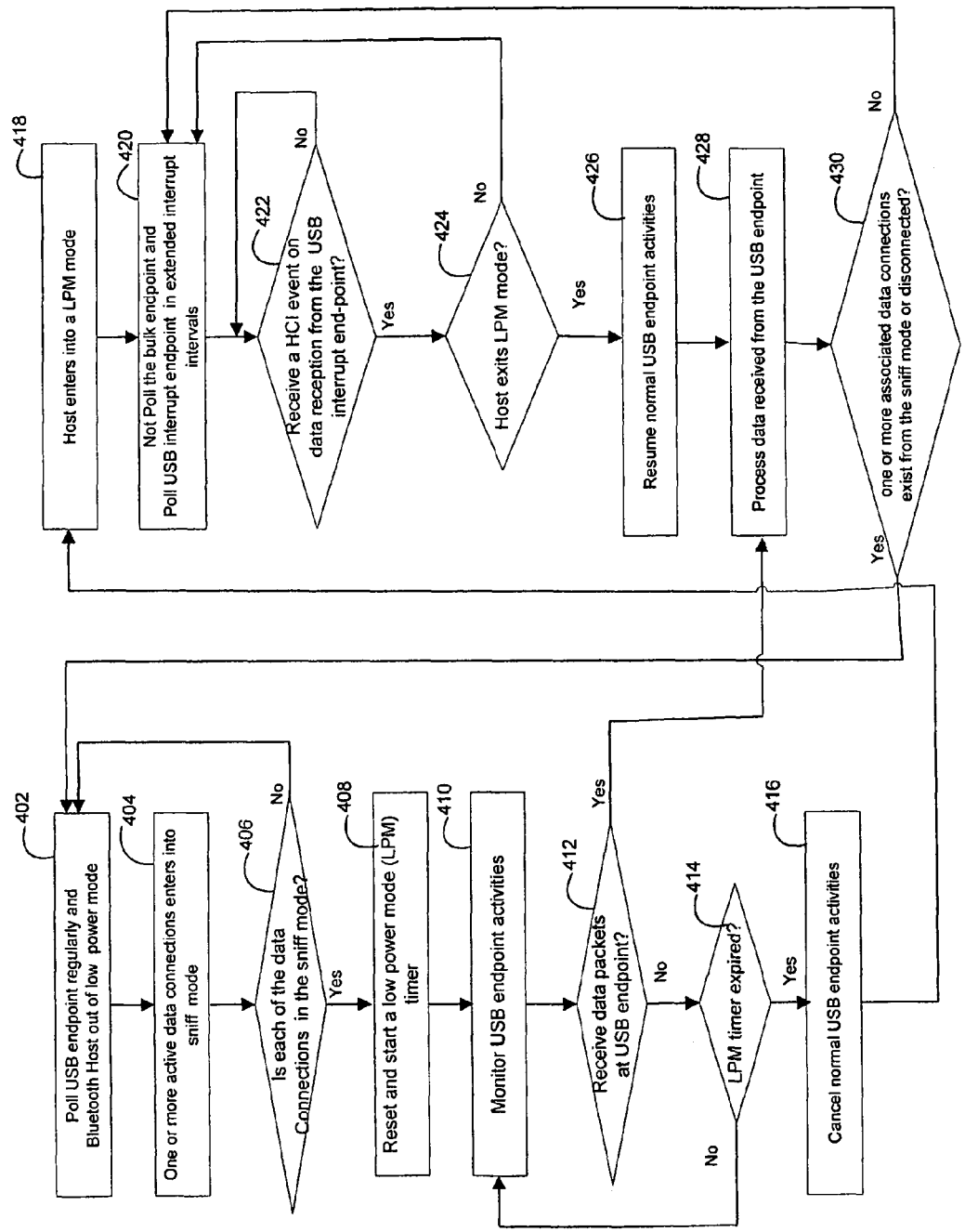
FIG. 4 is a flow chart that illustrates exemplary steps for saving host power in a Bluetooth enabled device via a reduced USB polling rate, in accordance with an embodiment of the invention.

FIG. 4 is a flow chart that illustrates exemplary steps for saving host power in a Bluetooth enabled device via a reduced USB polling rate, in accordance with an embodiment of the invention. Referring to FIG. 4, the exemplary steps begin in step 402, where the Bluetooth host 200 may be operating in a normal mode. The Bluetooth USB radio 300 may be communicatively coupled with the Bluetooth host 200 and have one or more Bluetooth data links or connections with peer Bluetooth radios. The host processor 206 may be enabled to poll USB endpoints such as the interrupt endpoint 202b regularly. In step 404, the one or more active Bluetooth data links or connections may be operable to enter a sniff mode. In step 406, it may be determined that whether each of the Bluetooth data links or connections is in a sniff mode. In instances where it may be determined that each of the active Bluetooth data links or connections is in sniff mode, then in step 408, the host processor 206 may be configured to reset and start a low power mode (LPM) timer. The LPM timer may be utilized to provide a reset to the host processor 206 in case when time that the host processor 206 is in the low power mode expires.

In step 410, the Bluetooth host 200 may be enabled to monitor activities at, for example, the control endpoint 202a of the Bluetooth USB radio 300 for HCI-specific commands from the Bluetooth host 102 to the Bluetooth module 306, the interrupt endpoint 202b for HCI events from the Bluetooth module 306 to the Bluetooth host 102, respectively. Bluetooth data traffic such as ACL data packets between the Bluetooth host 200 and the Bluetooth module 306 may trigger USB activities at the bulk endpoint 202c of the Bluetooth host 200. In step 412, it may be determined whether Bluetooth data packets may be received at USB endpoints such as the bulk endpoint 202c. In instances where it may be determined that Bluetooth data may not be received at USB endpoints such as the bulk endpoint 202c, then in step 414, where it may be determined that the HLPM timer may expire. In instances where the HLPM timer may have expired, then in step 416, where the Bluetooth host 200 may be enabled to cancel USB activities over the USB connection.

In step 418, the Bluetooth host 200 may be enabled to enter a low power mode such as the C3 state from a normal mode. In step 420, the Bluetooth host 200 may be enabled not to poll the bulk endpoint 202c and to poll the interrupt endpoint 301b in extended interrupt intervals. In step 422, it may be determined by the Bluetooth host 102 if a special HCI event for data reception over associated Bluetooth connections in sniff mode is received from the USB interrupt end-point 202b. In instances where the Bluetooth host 200 may be enabled to determine that a special HCI event for data reception over associated Bluetooth connections in sniff mode is received from the USB interrupt end-point 202b, then in step 424, where it may be determined if the Bluetooth host 102 may be willing to exit the low power mode. In instances where the it may be determined that the Bluetooth host 102 may exit the low power mode, then in step 426, the Bluetooth host 102 may be enabled to resume normal USB endpoint activities such as polling the bulk endpoint 202c. The exemplary process continues in step 428. In step 428, the host processor 206 may be enabled to process data received from the USB endpoint such as the bulk endpoint 202c. In step 430, it may be determined whether one or more associated data connections exist from the sniff mode or disconnected. In instances where it may be determined by the host processor 206 that one or more associated data connections exist from the sniff mode or disconnected, then the exemplary process returns to step 402.

In step 406, in instances where it may be determined that at least one of the Bluetooth data links or connections is not in a sniff mode, then, the exemplary process returns to step 402. In step 412, in instances where it may be determined that Bluetooth data may be received at the bulk endpoint 202c, then, the exemplary process returns to step 428. In step 414, in instances where the HLPM timer may not be expired, then, the exemplary process returns to step 410. In step 422, in instances where the Bluetooth host 200 may be enabled to determine that a special HCI event for data reception over associated Bluetooth connections in sniff mode is not received from the USB interrupt end-point 202b, then exemplary process stays in step 422. In step 424, in instances where it may be determined that the Bluetooth host 200 may not exit the low power mode, then exemplary process stays in step 420. In step 430, in instances where it may be determined that the associated Bluetooth data links or connections may not exit from the sniff mode, then the exemplary process continues in step 420.

Figure 5:
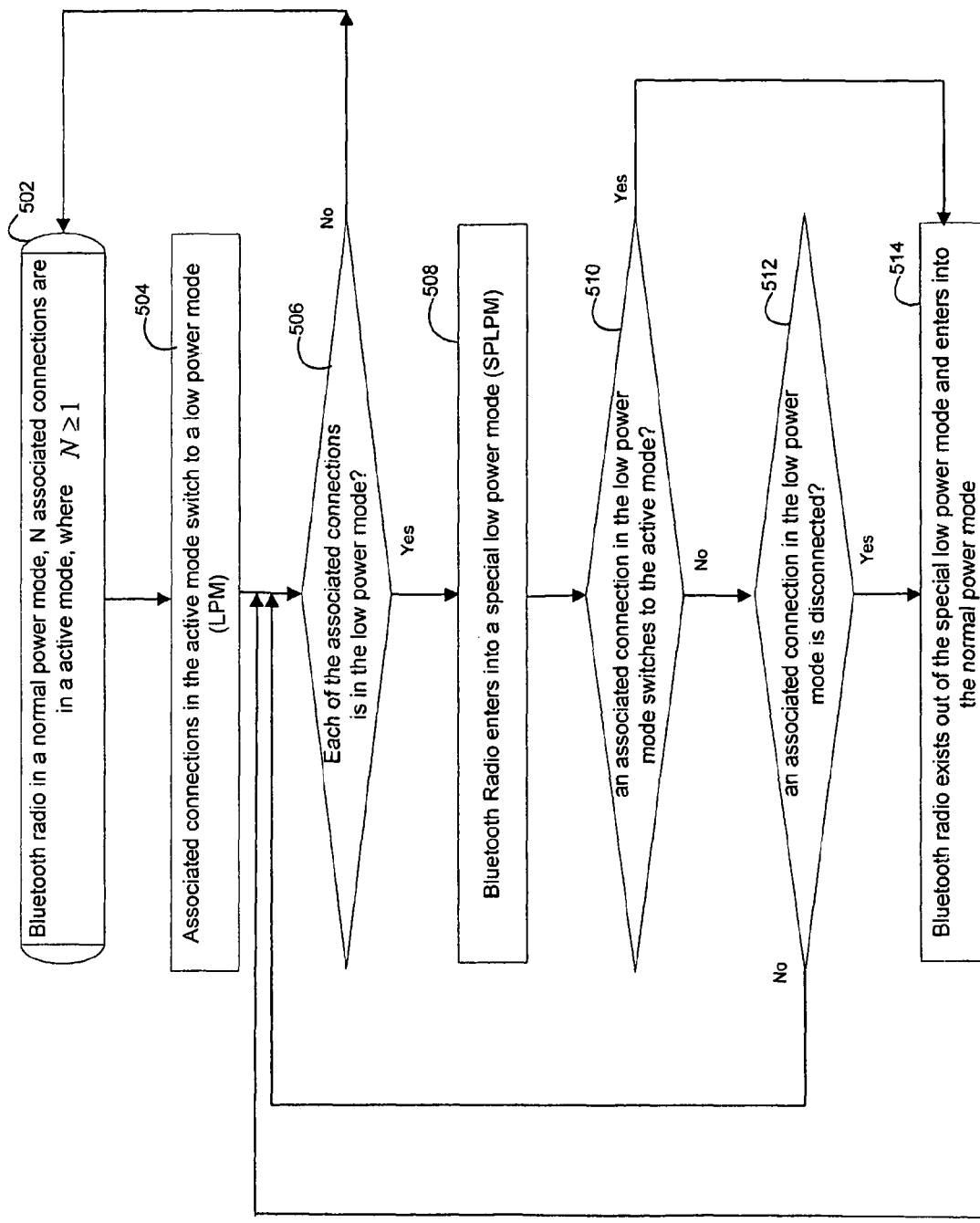
FIG. 5 is a flow chart that illustrates exemplary steps in which a Bluetooth radio switches between a special low power mode and a normal power mode based on the number of associated low power connections, in accordance with an embodiment of the invention.

FIG. 5 is a flow chart that illustrates exemplary steps in which a Bluetooth radio switches between a special low power mode and a normal power mode based on the number of associated low power connections, in accordance with an embodiment of the invention. Referring to FIG. 5, the exemplary steps begin in step 502, where the Bluetooth radio 300 may be operate in a normal power mode. N associated connections are in an active mode, where N≧1. In step 504, one or more of the N associated connections in the active mode may switch to a low power mode (LPM). In step 506, it may be determined if each of the N associated connections in the active mode may be in the low power mode (LPM). In instances where it may be determined that each of the N associated connections in the active mode may be in the low power mode (LPM), then in step 508, the Bluetooth radio 300 may enter into a special low power mode (SPLPM). In step 510, it may be determined that one or more of the associated connection in the low power mode may switch back to the active mode. In instances where it may be determined that none of the associated connection in the special low power mode may switch back to the active mode, then in step 512, it may be determined that one or more of the associated connection in the low power mode are disconnected. In instances where it may be determined that one or more of the associated connection in the low power mode are disconnected, then in step 514, where the Bluetooth radio 300 may be configured to exit out of the special low power mode and enter into the normal power mode. The exemplary process returns to the step 506.

In step 506, in instances where it may be determined that each of the N associated connections is not in the active mode is in the low power mode (LPM), then the exemplary steps return to step 502.

In step 510, in instances where it may be determined that one or more of the associated connections in the low power mode the Bluetooth radio 300 may switch back to the active mode. The exemplary steps then continue to step 514.

In step 512, in instances where it may be determined that none of the associated connections in the low power mode is disconnected, then the exemplary steps return to step 506.

Figure 6:
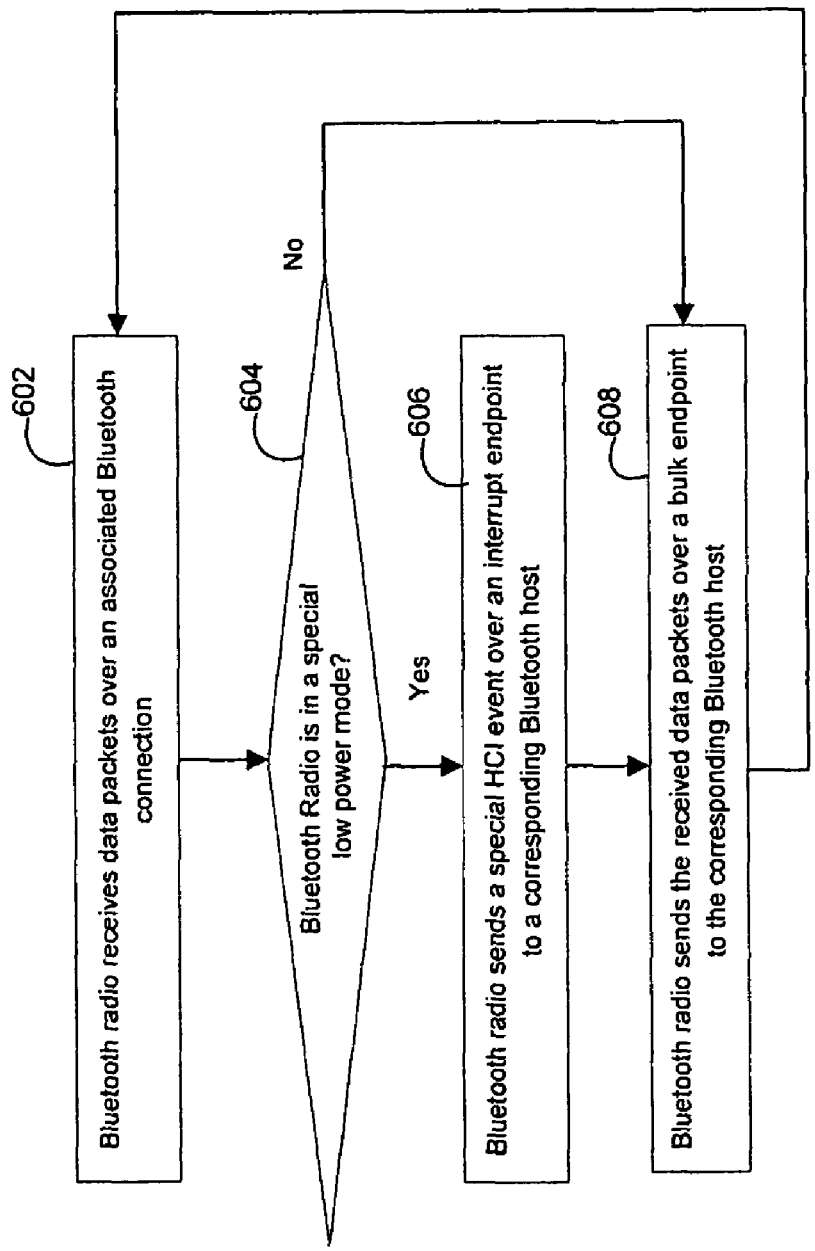
FIG. 6 is a flow chart that illustrates exemplary steps in which a Bluetooth radio processes received Bluetooth data packets based on corresponding operation mode, in accordance with an embodiment of the invention.

FIG. 6 is a flow chart that illustrates exemplary steps in which a Bluetooth radio processes received Bluetooth data packets based on corresponding operation mode, in accordance with an embodiment of the invention. Referring to FIG. 6, the exemplary steps begin in step 602, where the Bluetooth radio 300 may be enabled to receive data packets over an associated Bluetooth connection. In step 604, it may be determined that the Bluetooth radio 300 is in a special low power mode. In instances where it may be determined that the Bluetooth radio 300 is in a special low power mode, then in step 606, the Bluetooth radio 300 may be enabled to send a special HCI event over the interrupt endpoint 202b to the Bluetooth host 200. In step 608, the Bluetooth radio 300 may be enabled to send the received data packets over the bulk endpoint 202c to the Bluetooth host 200.

In step 604, in instances where it may be determined that the Bluetooth radio 300 is not in a special low power mode, then the exemplary steps continue in step 608.

Aspects of a method and system for a reduced USB polling rate to save power on a Bluetooth host are provided. In accordance with various embodiments of the invention, the Bluetooth enabled device 100 comprises the Bluetooth host 102 and the Bluetooth USB radio 104. One or more Bluetooth connections are in an active mode between the Bluetooth USB radio 104 and one or more peer Bluetooth radios. The Bluetooth host 102 operates in a normal power mode. The Bluetooth host 102 is operable to monitor activities at corresponding USB endpoints such as endpoints 202a-202f. The Bluetooth host 102 may be enabled to cancel normal USB activities at the USB endpoints such as the bulk endpoint 202c when, for example, each of associated one or more Bluetooth data connections is in a particular Bluetooth mode of operation such as a sniff mode. The Bluetooth host 102 may be enabled to enter a low power mode such as, the C3 state (sleep state, deep sleep state, and deeper sleep state). The Bluetooth USB radio 104 may be configured to keep the associated one or more Bluetooth data links or connections alive while the Bluetooth host 102 in the low power mode.

The USB endpoints comprise the control endpoint 202a, the interrupt endpoint 202b, the bulk endpoint 202c, and one or more isochronous endpoints 202d-202f. In the normal mode, the Bluetooth host 102 may be enabled to read and receive Bluetooth data such as ACL data and SCO data over the bulk endpoint 202c and the one or more isochronous endpoints 202c-202f, respectively. The host processor 206 may be enabled to process the received Bluetooth data from the Bluetooth USB radio 104. The host processor 206 may be enabled to determine whether each of associated one or more Bluetooth data links or connections may operate in a particular Bluetooth mode of operation such as Bluetooth sniff mode before cancelling normal USB activities at the USB endpoints such as the bulk endpoint 202c. In the low power mode, the Bluetooth host processor 206 may be enabled not to poll the bulk endpoint 202c and to poll the interrupt endpoint 202b within extended interrupt intervals as described in step 420 with respect to FIG. 4. In instances where the Bluetooth USB radio 104 may be enabled to receive Bluetooth data over each of the one or more associated Bluetooth data links or connections in sniff mode, the Bluetooth host 200 may be enabled to switch from the low power mode to the normal mode when a specific HCI event is received over the interrupt endpoint 202*b*. The received HCI event may indicate that the Bluetooth data may be received by the Bluetooth USB radio 104 over the one or more associated Bluetooth data links or connections in sniff mode. Subsequently, the Bluetooth host 200 may be enabled to poll the bulk endpoint 202*c* for the Bluetooth data and process the Bluetooth data received over the bulk endpoint 202*c*.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for a reduced USB polling rate to save power on a Bluetooth host.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system, comprising:
   a host processor in a Bluetooth enabled device, the host processor being configured to:
      determine whether all active Bluetooth connections of a Bluetooth Universal Serial Bus (USB) radio are in a particular Bluetooth mode of operation, the Bluetooth USB radio having at least one active Bluetooth connection; and
      enter a low power mode in response to determining that all of the active Bluetooth connections of the Bluetooth USB radio are in the particular Bluetooth mode of operation.

2. The system of claim 1, wherein the host processor is configured to enter a normal power mode from the low power mode in response to determining that at least one previously active Bluetooth connection of the Bluetooth USB radio has become disconnected.

3. The system of claim 1, wherein the host processor is configured to enter a normal power mode from the low power mode in response to determining that at least one active Bluetooth connection of the Bluetooth USB radio has exited the particular Bluetooth mode of operation.

4. The system of claim 1, wherein the host processor is configured to enter a normal power mode from the low power mode in response to determining that data has been received by the Bluetooth USB radio over at least one active Bluetooth connection.

5. The system of claim 4, wherein the host processor is configured to:
   poll a USB bulk endpoint of the Bluetooth USB radio, subsequently to entering the normal power mode from the low power mode, for the data that has been received by the Bluetooth USB radio over the at least one active Bluetooth connection;
   obtain, over the USB bulk endpoint, the data that has been received by the Bluetooth USB radio over the at least one active Bluetooth connection; and
   process the data obtained over the USB bulk endpoint.

6. The system of claim 1, wherein the particular Bluetooth mode of operation is a Bluetooth sniff mode.

7. The system of claim 1, wherein the host processor is further configured to cancel normal USB activities of at least one USB endpoint of the Bluetooth USB radio in response to determining that all of the active Bluetooth connections of the Bluetooth USB radio are in the particular Bluetooth mode of operation.

8. The system of claim 1, wherein the low power mode is selected from the group consisting of: a sleep mode, a deep sleep mode, and a deeper sleep mode.

9. The system of claim 1, wherein, in response to entering the low power mode, the host processor is configured not to poll a USB bulk endpoint of the Bluetooth USB radio.

10. The system of claim 1, wherein, in response to entering the low power mode, the host processor is configured to poll a USB interrupt endpoint of the Bluetooth USB radio at extended polling intervals.

11. A method, comprising the steps of:
   determining, by a host processor in a Bluetooth enabled device, whether all active Bluetooth connections of a Bluetooth Universal Serial Bus (USB) radio are in a particular Bluetooth mode of operation, the Bluetooth USB radio having at least one active Bluetooth connection; and
   entering a low power mode by the host processor in response to determining that all of the active Bluetooth connections of the Bluetooth USB radio are in the particular Bluetooth mode of operation.

12. The method of claim 11, further comprising the step of entering a normal power mode from the low power mode by the host processor in response to determining that at least one previously active Bluetooth connection of the Bluetooth USB radio has become disconnected.

13. The method of claim 11, further comprising the step of entering a normal power mode from the low power mode by the host processor in response to determining that at least one active Bluetooth connection of the Bluetooth USB radio has exited the particular Bluetooth mode of operation.

14. The method of claim 11, further comprising the step of entering a normal power mode from the low power mode by the host processor in response to determining that data has been received by the Bluetooth USB radio over at least one active Bluetooth connection.

15. The method of claim 14, further comprising the steps of:
- polling a USB bulk endpoint of the Bluetooth USB radio by the host processor, subsequently to entering the normal power mode from the low power mode, for the data that has been received by the Bluetooth USB radio over the at least one active Bluetooth connection;
- obtaining, over the USB bulk endpoint by the host processor, the data that has been received by the Bluetooth USB radio over the at least one active Bluetooth connection; and
- processing by the host processor the data obtained over the USB bulk endpoint.

16. The method of claim 11, wherein the particular Bluetooth mode of operation is a Bluetooth sniff mode.

17. The method of claim 11, further comprising the step of cancelling by the host processor normal USB activities of at least one USB endpoint of the Bluetooth USB radio in response to determining that all of the active Bluetooth connections of the Bluetooth USB radio are in the particular Bluetooth mode of operation.

18. The method of claim 11, wherein, in response to entering the low power mode, the host processor is configured not to poll a USB bulk endpoint of the Bluetooth USB radio.

19. The method of claim 11, wherein, in response to entering the low power mode, the host processor is configured to poll a USB interrupt endpoint of the Bluetooth USB radio at extended polling intervals.

20. A system, comprising:
- means for determining in a Bluetooth enabled device, whether all active Bluetooth connections of a Bluetooth Universal Serial Bus (USB) radio are in a particular Bluetooth mode of operation, the Bluetooth USB radio having at least one active Bluetooth connection; and
- means for entering a low power mode by a host processor in response to determining that all of the active Bluetooth connections of the Bluetooth USB radio are in the particular Bluetooth mode of operation.

* * * * *